UNITED STATES PATENT OFFICE.

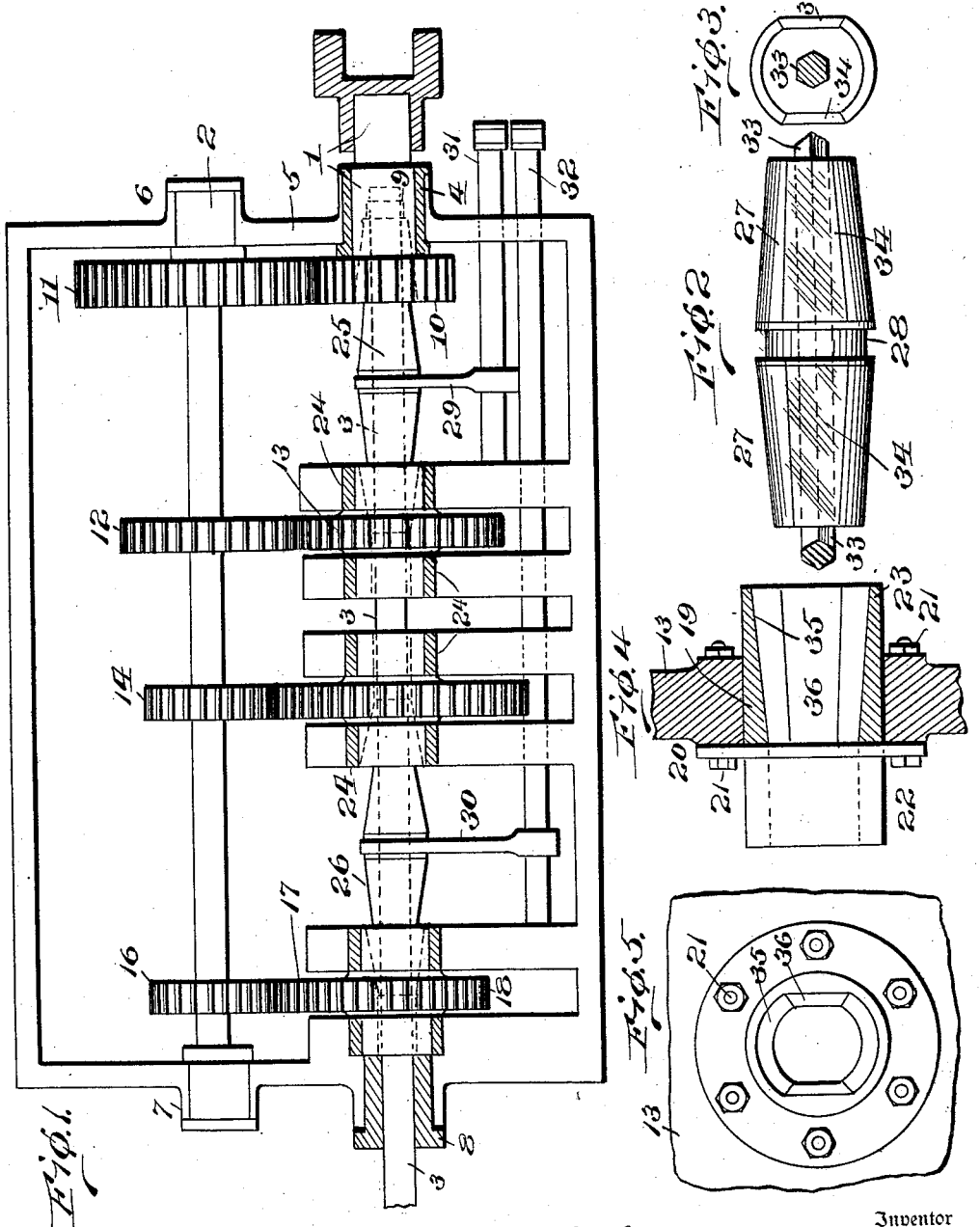

JOHN TYNDALL WILLIAMS, OF SWANSEA, WALES.

CLUTCH MECHANISM.

1,077,776.  Specification of Letters Patent.  Patented Nov. 4, 1913.

Application filed April 3, 1912. Serial No. 688,245.

*To all whom it may concern:*

Be it known that I, JOHN TYNDALL WILLIAMS, a subject of the King of Great Britain, and resident of Swansea, Wales, have invented certain new and useful Improvements in Clutch Mechanism; and I do hereby declare the following to be a full, clear, and exact description of the invention, such as will enable others skilled in the art to which it appertains to make and use the same.

This invention relates to cone clutches, particularly the type of cone clutch which has positively locking members so that one member may be locked against another to afford a positive drive, as distinguished from a frictional drive.

The clutch shown herewith may be used on any type of machine where clutches of the ordinary positive type are used, there being supplied suitable actuating means and driving means associated with the machine which form no part of the present invention.

The invention comprises generally a cone provided with flat surfaces and slidably mounted to engage a complementary cone member secured to the driving or driven member.

The sliding conical block is double ended, consisting of two truncated cones placed base to base and the whole member can be moved in one direction or the other so as to engage with one or other of two gear wheels mounted to the right and left of the member respectively.

My invention is distinguished from others of a like kind both as regards details of construction and also in this, that the engaging surface of the block and drum are flattened at either extremity of a diameter, so that a positive transmission from one to the other is secured when they are in engagement; this method of flattening the engaging surfaces is superior to the mounting of the surfaces eccentrically to the shaft, a course that has been proposed.

I will now proceed to describe my invention with reference to the accompanying drawings wherein—

Figure 1 is a diagrammatic side view of one half of a gear box showing my improved clutch as used in variable speed gearing. Figs. 2 and 3 side and end views of the cone respectively and Figs. 4 and 5 sectional and end views respectively of the drum.

The present invention will be described in connection with variable speed gearing, as shown in Fig. 1, this gearing showing simply one method of using the improved clutch and forming no part of the present invention.

As shown 1 is the power shaft, 2 the lay shaft, and 3 the transmission shaft; the power shaft has a bearing 4 in the gear case 5, the lay shaft bearings 6, 7, in the same, and the transmission shaft a bearing 8 in the same, and also a thrust bearing in the shaft 1 at 9. The shaft 3 is hexagonal in cross section, excepting where it passes through the bearings.

The gear wheel 10, fast on the power shaft 1 is in permanent engagement with the gear wheel 11 fast on the lay shaft 2, and the gear wheels 12, 14 and 16 also fast on said shaft are in permanent engagement with the gear wheels 13, 15, respectively loosely mounted on the transmission shaft 3, and with the reverse pinion 17 which engages with the loosely mounted gear wheel 18 also on the shaft 3. Each of the gear wheels 13, 15, 18 is mounted upon a cone drum 19 as shown in Figs. 4 and 5. The drum 19, has a flange 20, and the wheel is bolted to this by bolts and nuts 21. The bosses 22 and 23 formed by the drum are mounted in bearings 24, standing up from the casing 6.

The clutch blocks 25, 26 have cones 27 arranged base to base and separated by a grooved neck 28 adapted to receive the clutch forks 29, 30, which are operated by the shifting rods 31, 32. These blocks are slidably mounted on the hexagonal portion 33 of the transmission shaft 3. I find that the cross-sectional shape for the blocks, best adapted to secure the positive drive is obtained by forming two flats 34 thereon as shown in Figs. 2 and 3 of the drawings, each flat being one-sixth of the circumference of the cone at the point where a section is taken, so that the flats gradually taper from one end to the other. The drums are cone-shaped internally, as shown at 35 (Figs. 4 and 5) to receive the cones and also have flats 36 of the same dimensions as those on the cone; said drums are, of course, hollow all the way through (except for the one carrying the gear wheel 10) to permit of the passage of the transmission shaft 3; the latter may have a bearing in said drums if necessary.

Although the change speed gearing shown, contains only 3 speeds forward and a reverse, my invention can be of course employed with any number of speeds: in connection with motor cars or any machinery where the speed or power is governed by means of variable gears.

Having now particularly described and ascertained the nature of my said invention and in what manner the same is to be performed, I declare that what I claim is:—

1. A clutch comprising a conical member formed with opposite flattened portions, the flattened portions each cutting off approximately one-sixth of the surface of the cone, and a complementary coöperating clutch member adapted to engage the first mentioned clutch member.

2. A clutch, comprising a conical member formed with flattened portions, a complementary coöperating clutch member, the said members being movable with respect to each other, the ratio of the width of the flattened portion to the circumference of the cone being constant throughout the length of the conic members.

In testimony whereof I affix my signature in presence of witnesses.

JOHN TYNDALL WILLIAMS.

Witnesses:
EDWARD L. CARTHEW,
EDWARD A. T. WILLIAMS,
B. THOMAS.

---

Copies of this patent may be obtained for five cents each, by addressing the "Commissioner of Patents, Washington, D. C."